Figure 1:
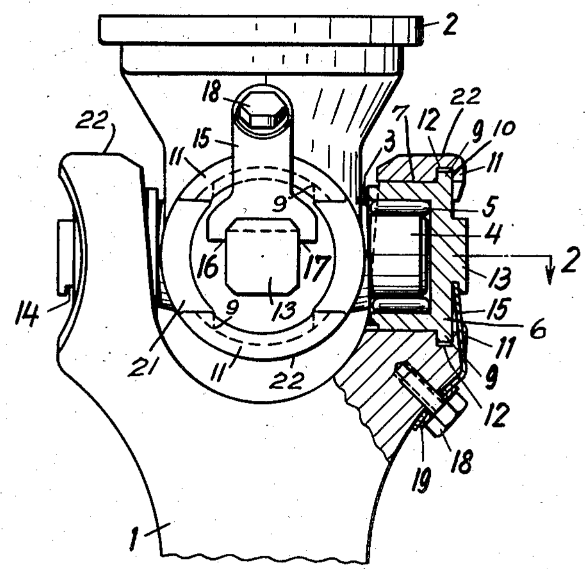

Jan. 20, 1959 J. GNAMBS 2,869,341

JOINT, IN PARTICULAR UNIVERSAL JOINT

Filed Dec. 5, 1955

INVENTOR

JOSEF GNAMBS

BY *Dicke and Craig.*

ATTORNEYS.

2,869,341

JOINT, IN PARTICULAR UNIVERSAL JOINT

Josef Gnambs, Stuttgart-Wangen, Germany, assignor to Daimler-Benz Aktiengesellschaft, Stuttgart-Unterturkheim, Germany Application December 5, 1955, Serial No. 551,164

Claims priority, application Germany December 14, 1954

6 Claims. (Cl. 64—17)

This invention relates to a joint, and more particularly to a knuckle or universal joint whose bolt is preferably supported in needle-like roller elements.

One object of the present invention is to provide a joint, in particular a knuckle or universal joint designed with smallest possible outside diameter and thus requiring not only little mass but also very little space.

Another object of the present invention is to provide a joint of the type referred to which is of simple sturdy practical construction ensuring easy and quick assembly.

A further object of the present invention is to provide a universal joint of the type referred to including simple but nevertheless reliable means for securing the bearing cups, which support the joint bolt, against axial displacement, and/or against turning with respect to the joint members for supporting said bearing cups.

An essential feature of the present invention consists therefore in a construction wherein each bearing cup for supporting the joint bolt is mounted by means of a bayonet lock in a bore of the joint member for supporting it.

According to another feature of the present invention, each bearing cup is provided with an axial polygonal projection, for example, in the form of a square head, which renders it possible to turn and adjust the bearing cup by means of a wrench to its proper position, after it has been inserted in its bore. At the same time the square head may serve for securing the bearing cup against turning and thus against axial falling out of its bore in the joint fork, in that it is, for example, secured on the joint body by means of a locking plate.

Further objects, features and advantages of the present invention will become apparent from the following description taken in connection with the accompanying drawings which illustrate one embodiment of the invention.

Figure 2:
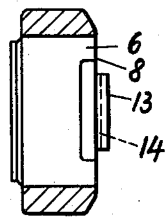

In the drawings:

Fig. 1 is an elevational view of the one universal joint constructed in accordance with the present invention and showing the needle bearing for the joint bolt in section, and Fig. 2 is a sectional view taken in plane of the line 2 in Fig. 1.

Referring now to the drawings, it will be seen that the universal joint illustrated in Figures 1 and 2 includes a fork 1 and a coupling member 2 connected together by means of a star member 3 provided with four joint bolts 4 made integrally therewith. The fork 1 as well as the coupling member 2 terminates in eye portions 22 each of which includes a bore 7, a circular groove 12 and projections 11. A transverse recess 21 is cut across the face of each eye portion 22 to a depth at least even with the outer wall portion 10 of the circular groove 12 whereby portions equivalent to the width of the recess 21 are removed. The joint bolts 4 are mounted on needles 5 in needle bearing cups 6, which are open at one end. Lugs 9 are provided at the closed end 8 of each bearing cup 6 which project radially outwardly to a diameter equal or slightly less than the inside diameter of the circular groove 12 having a width equal or slightly less than the width of the recess 21. The bearing cup 6 is inserted into the bores 7 in such a manner that the lugs 9 are in line with the recess 21. The bearing cup 6 is then turned 90 degrees in the bore 7 so that the lugs 9 slide into the grooves 12. The bearing cups 6 are thus axially secured in the bore 7. The closed end 8 of the bearing cups 6 is on the outside provided with a square boss 13. A groove 14 is cut along one side of each square boss 13. A locking plate 15 engages the groove 14 as well as two sides of the square boss at 16 and 17. The locking plate 15 is formed to fit the shape of the joint fork and coupling member respectively, and is fastened on these parts by means of a set screw 18. The latter is secured on the joint fork 1 and coupling member 2 respectively by a lock nut 19.

It will be obvious that the details of construction may be varied from those shown in the drawings. I therefore do not limit myself to such details.

What I claim is:

1. A joint comprising a first joint member, a second joint member, a joint bolt member connecting said first joint member and said second joint member with one another for universal movement thereof, bearing cups for supporting said joint bolt member in said joint members and being rotatably supported in said joint members, said bearing cups including lugs projecting radially outwardly therefrom, said joint members being provided with bores and a circular groove at each end of said bores of a diameter substantially equal to the radial projection of said lugs and with a recess disposed perpendicularly to the direction of said bores, said recesses extending in depth at least to said circular groove and having a width substantially equal to the width of said lugs, said bearing cups being axially secured in said bores by bringing said lugs into engagement with said circular grooves through rotation of said cups relative to said joint member, said bearing cup including a closed end with a polygonal projection at the outside of said closed end providing the means for rotation of said bearing cup about its axis, a locking element fastened at said joint member and being in engagement with said polygonal projection on said bearing cup wherein said locking element is a locking plate extending radially on the outer face of said bearing cup and having a recess adapted for both fitting and accepting said polygonal projection, and means for detachably connecting said locking plate on said joint member.

2. A joint comprising a first joint member, a second joint member, a joint bolt member connecting said first joint member and said second joint member with one another for universal movement thereof, bearing cups for supporting said joint bolt member in said joint members and being rotatably supported in said joint members, said bearing cups including lugs projecting radially outwardly therefrom, said joint members being provided with bores and a circular groove at each end of said bores of a diameter substantially equal to radial projection of said lugs and with a recess disposed perpendicularly to the direction of said bores, said recesses extending in depth at least to said circular groove and having a width substantially equal to the width of said lugs, said bearing cups being axially secured in said bores by bringing said lugs into engagement with said circular grooves through rotation of said cups relative to said joint members, wherein said bearing cup is provided with a one-sided groove, further comprising a locking plate with means for its fastening on said last-mentioned joint member and engaging said groove to thus secure said bearing cup against turning with regard to said joint member.

3. A joint comprising a first joint member, a second joint member, a joint bolt member connecting said first joint member and said second joint member with one another for universal movement thereof, bearing cups for supporting said joint bolt member in said joint members and being rotatably supported in said joint members, said bearing cups including lugs projecting radially outwardly therefrom, said joint members being provided with bores and a circular groove at each end of said bores of a diameter substantially equal to radial projection of said lugs and with a recess disposed perpendicularly to the direction of said bores, said recesses extending in depth at least to said circular groove and having a width substantially equal to the width of said lugs, said bearing cups being axially secured in said bores by bringing said lugs into engagement with said circular grooves through rotation of said cups relative to said joint member, wherein said bearing cup is provided with a one-sided groove, further comprising a locking plate with means for its fastening on said last-mentioned joint member and engaging said groove to thus secure said bearing cup against turning with regard to said joint member, a polygonal projection being provided on the outside of said closed end of said bearing cup, said groove being located at least on one side of said projection, and said locking plate having a unilaterally open cut-out with three edges angularly arranged as to each other of which the center one engages said groove whereas the two outer edges abut against the outside of said polygonal projection on two sides.

4. A joint comprising a first joint member, a second joint member, a joint bolt member connecting said first joint member and said second joint member with one another for universal movement thereof, bearing cups arranged in said joint members for supporting said joint bolt member therein, locking means in the form of a bayonet lock for axially securing said bearing cups in said joint members, said bearing cups including a polygonal projection at one end thereof, a locking element in the form of a locking plate extending radially at said one end of said bearing cup and being provided with a recess adapted for partially embracing said polygonal projection and means for detachably connecting said locking plate to said joint member.

5. A joint according to claim 4, wherein said polygonal projection is provided with a one-sided groove, said locking plate engaging said groove for securing said bearing cup against turning with regard to said joint member.

6. A joint according to claim 5, wherein said polygonal projection extends in an axial direction from said one end, said groove being located on one side of said polygonal projection, said locking plate having a unilaterally open cut-out forming three edges angularly displaced one to another, the center edge of said three edges engaging said groove whereas the two outer edges abut against the outside of said polygonal projection on two sides thereof.

References Cited in the file of this patent

UNITED STATES PATENTS

| | | |
|---|---|---|
| 1,993,357 | Braun et al. | Mar. 5, 1935 |
| 2,018,768 | Swenson | Oct. 29, 1935 |
| 2,114,861 | Slaght | Apr. 19, 1938 |
| 2,204,745 | Anderson | June 18, 1940 |
| 2,273,920 | Anderson | Feb. 24, 1942 |
| 2,512,690 | Smith et al. | June 27, 1950 |